United States Patent [19]

Fleming, Jr.

[11] Patent Number: 4,477,580

[45] Date of Patent: Oct. 16, 1984

[54] METHOD FOR MAKING GERMANIUM-SILICATE GEL GLASS AND ARTICLES

[75] Inventor: James W. Fleming, Jr., Fanwood, N.J.

[73] Assignee: AT&T Bell Laboratories, Murray Hill, N.J.

[21] Appl. No.: 425,692

[22] Filed: Sep. 28, 1982

[51] Int. Cl.³ ............................ C03C 3/04; C03C 3/12
[52] U.S. Cl. .......................................... 501/12; 65/17; 501/37; 501/42; 501/54; 501/55; 501/73
[58] Field of Search ..................... 501/12, 55, 42, 37, 501/73; 65/17

[56] References Cited

U.S. PATENT DOCUMENTS

| | | | |
|---|---|---|---|
| 3,884,550 | 5/1975 | Maurer et al. | 501/42 |
| 3,954,431 | 5/1976 | Fleming | 65/18.4 |
| 4,220,461 | 9/1980 | Samanta | 65/22 |
| 4,278,632 | 7/1981 | Yoldas | 501/55 |
| 4,323,381 | 4/1982 | Matsuyama et al. | 65/22 |

FOREIGN PATENT DOCUMENTS 2041913A 9/1980 United Kingdom .

OTHER PUBLICATIONS

Schlichting, J. et al.—"GeO$_2$/SiO$_2$-Glasses from Gels to Increase the Oxidation Resistance of Porous Silicon Containing Ceramics," J. of Non-Crystalline Solids, 48 (1982), pp. 185–194.

Sakka, S.—"Gel Method for Making Glass" Treatise on Materials Science and Technology, 22 (1982), pp. 129–167.

Johnson, O. H. et al., "Tetraalkoxygermanes", J. Am. Chem. Soc. 75 (1953), pp. 718–720.

Nogami, M. et al., "Glass Formation Through Hydrolysis of Si(OC$_2$H$_5$)$_4$ With NH$_4$OH and HCl Solution''—J. of Non-Crystalline Solids, 37 (1980), pp. 191–201.

Susa, K. et al., "New Optical Fibre Fabrication Method", Electronics Letters, 18 (12) (1982), pp. 499–500.

Primary Examiner—Helen M. McCarthy
Attorney, Agent, or Firm—James H. Fox; Kurt C. Olsen

[57] ABSTRACT

Optical components using a germania-silica glass are made by a gel technique. Tetra pentyloxygermane and a silicon alkoxide are hydrolyzed to form a gel, which is subsequently dried. Optical components, including optical fibers and devices, can be made using glass prepared by this technique.

4 Claims, No Drawings

METHOD FOR MAKING GERMANIUM-SILICATE GEL GLASS AND ARTICLES

BACKGROUND OF THE INVENTION

1. Field of the Invention

This invention relates to a gel glass technique for making a germanium-containing silicate glass for optical fibers and devices.

2. Description of the Prior Art

Monolithic gel oxide glass preparation has recently received increased interest primarily because of the striking differences in the fabrication of bulk glass when compared with conventional techniques, and associated potential advantages resulting from these differences, such as high homogeneity and purity. Gel glasses are formed from liquid precursors which undergo a solidification through a slow, continuous increase in viscosity. Theoretically dense glass is formed without exceeding temperatures more than 200° C. above the glass transition. From the initial through the final stages of fabrication, the material remains transparent, although it generally changes density by approximately a factor of 2 and changes bulk volume by approximately 80 percent. An exciting prospect is that multicomponent compositions which were difficult to fabricate by conventional techniques because of significantly different thermal characteristics of the individual oxide precursors can now be mixed to high homogeneity and formed to solid glass at relatively low temperatures.

Of particular interest are glasses in the binary $GeO_2$—$SiO_2$ system because of their importance to lightguide fiber and devices. Germania ($GeO_2$) is known to increase the index of refraction of silica glass. The cores of silica optical fibers typically include germania, which helps confine optical energy to the core when surrounded by a lower index of refraction cladding. Similarly, optical waveguides formed on a substrate typically obtain guiding of optical energy by forming a relatively higher index of refraction region surrounded by a lower index of refraction region. Other optical functions, including polarizers, diffraction gratings, directional couplers, delay lines, lenses, etc., make use of regions of higher refractive index material in silica. In nonoptical applications, glasses are used as passivating layers; for example, in semiconductor device fabrication, germanium is known to typically lower the temperatures at which a silicate glass will flow.

Most gel work done today is based on using a silicon alkoxide as the primary constituent; see, for example, *Treatise On Materials Science And Technology*, S. Sakka, Vol. 22, pages 129–167 (1982). Silicon alkoxides hydrolyze slowly and are easily formed into monolithic gels. Other alkoxides have been added to silicon alkoxide to form multicomponent monolithic gels, but appear to result in nonoptical quality glass; see "$GeO_2/SiO_2$-Glasses from Gels to Increase the Oxidation Resistance of Porous Silicon Containing Ceramics," J. Schlichting and S. Neumann, *Journal of Noncrystalline Solids*, Vol. 28, pages 185–193 (1982). Glasses containing limited amounts of $GeO_2$ have been prepared using a colloidal gel, which can be prepared by hydrolysis to form a translucent solid; see U.S. Pat. No. 3,954,431, coassigned with the present invention. The rate of hydrolysis is typically too rapid to yield a monolith. While this was a suitable method of making glasses, the microstructure of the resultant material is such that it has to be heated to temperatures well above the sublimation points of the dopants in order to obtain a clear bulk glass. Typically the gel was fired at a low temperature, ground to a fine powder, and subsequently fused by injection into an rf plasma flame. As the concentration of dopant is increased, the degree of inhomogeneity resulting from sublimation is also increased. It is desirable to obtain germanium dopant levels which exceed the limits of the earlier technique used to make homogeneous glasses.

SUMMARY OF THE INVENTION

I have invented a method of making articles comprising homogeneous silicate glass that contains germanium. In this technique, a gel is formed comprising hydrolized tetra pentyloxygermane (TPeOG) and a partially hydrolized silicon alkoxide. The gel is then substantially dried. The presently preferred silicon alkoxide is tetraethylorthosilicate (TEOS), with others being possible.

DETAILED DESCRIPTION

The following detailed description refers to a method of making an optical component comprising germanium-containing silica glass by the gel technique. As used herein, the term "optical component" means an article that utilizes optical transmission through the glass produced herein. The term thus includes optical fibers, optical waveguides, and other optical devices, including polarizers, diffraction gratings, directional couplers, delay lines, lenses, etc. Also as used herein, the term "substantially comprising", when referring to a component of the gel, means that the component is present in sufficient amount to form at least 1 mole percent of the resulting dried glass. The term "metal alkoxides" refers to all of the metal alkoxides in the gel, with germanium, silicon, phosphorus, etc., being considered metals, according to the convention in the art. The term "homogeneous" means that the glass is homogeneous on a microscopic scale. This is typically apparent by the transparent, rather than opaque or cloudy, nature of the resulting glass. The high degree of homogeneity obtained is also characterized by low Rayleigh and mie scattering of the glass. However, the glass composition can vary on a relatively larger scale; that is, germanium levels can vary in the glass to provide, for example, light confinement in optical fibers and other optical components.

In order to use the monolithic gel method for preparing germanium silicate glass, a germanium-containing compound which was compatible with a silicon alkoxide had to be found. The most commonly used silicon alkoxide is tetraethylorthosilicate (TEOS), $Si(OC_2H_5)_4$. Some ordinal characteristics of the compound should be as follows: (1) the compound should be a liquid at or near room temperature; (2) the compound should be miscible with TEOS and a compound capable of hydrolysis; (3) the compound should hydrolyze at a rate similar to that of TEOS under similar conditions such that when mixed with TEOS, there is no segregation of the two liquids during gel formation. It is estimated that other silicon alkoxides, including methyl-, butyl-, and pentyl-silicates, are also suitable in their gel-forming properties, and are included herein.

A number of germanium compounds were examined, chosen first on the basis of availability and room temperature phase. They are given in Table I, and all are homologous to TEOS. These were combined with TEOS, water, acetone, acetic acid, various alcohols, hydrochloric acid, and ammonium hydroxide in various combinations to discern if a miscible OH-containing sol could be formed from them. The mixing was performed in various orders and at different temperatures. The response of interest was whether the material met the above characteristics.

TABLE I

| Tetramethyloxygermane (TMOG) | Ge(OCH$_3$)$_4$ |
| Tetraethyloxygermane (TEOG) | Ge(OC$_2$H$_5$)$_4$ |
| Tetrabutyloxygermane (TBOG) | Ge(OC$_4$H$_9$)$_4$ |
| Tetrapentyloxygermane (TPeOG) | Ge(OC$_5$H$_{11}$)$_4$ |
| Tetrahexyloxygermane (THOG) | Ge(OC$_6$H$_{13}$)$_4$ |
| Tetrapropyloxygermane (TPrOG) | Ge(OC$_3$H$_7$)$_4$ |

Tetra propyloxygermane (TPrOG), tetra butyloxygermane (TBOG), tetra pentyloxygermane (TPeOG), and tetra hexyloxygermane (THOG) had to be fabricated in the laboratory. The technique employed was similar to that reported by Johnson and Fritz; see "Tetraalkoxygermanes," O. H. Johnson and H. E. Fritz, Journal Of The American Chemical Society, Vol. 75, pages 718-720 (1953). A flask was fitted with a reflux condenser and dropping tube with a dry nitrogen bubbler assembly attached. A motorized stirrer with a Teflon shaft and blade was available for stirring the reacting mixture. The alkoxide to be bound to Ge was reacted in the flask with metallic Na to form the sodium alkoxide. The combination was stoichiometric. Initially this reaction is exothermic, and cooling of the vessel was employed. Toward the end, the reaction slowed, and heating was used to increase the rate. The result of the reactions was in all cases a clear liquid. However, the product of the reaction with isopropyl alcohol was very viscous at room temperature. GeCl$_4$ was then titrated into the sodium alkoxide. This reaction to form the Ge alkoxide and NaCl is also exothermic, and external cooling was again employed. After the reaction was completed, the NaCl was removed by centrifuging or vacuum filtration. Then the clear liquid was refluxed to remove excess GeCl$_4$ and alcohol.

In the search for a compound having characteristics suitable for monolithic gel formation with TEOS, the response of interest was precipitate formation before or during gellation. It was known from previous work on colloidal gels that germanium tetra chloride, tetramethylorthogermanate, and tetraethylorthogermanate were all miscible in TEOS; see above-noted U.S. Pat. No. 3,954,431. However, in this early experience, there was nothing to indicate that the rate of hydrolysis could be slowed to the point that they could form a monolithic gel. To further explore the possibilities of using the methyl and ethyl oxygermanes, they were refluxed individually with TEOS for several hours. The objective was to discern if any prereaction could be achieved which would slow down and homogenize the rate of hydrolysis. Combination of the refluxed mixture with other possible OH donors added in small amounts led in all cases to precipitation of a white material in the liquid sol, presumably GeOH$_x$. Cooling of the mixtures and compound to the point where their viscosities barely permitted mixing was also ineffective. Again, the common failure was the formation of a white precipitate.

The above organometallics are the only ones found to be commercially available. Several germanium alkoxides of higher molecular weight are listed in Table I in addition to those discussed above. TBOG also hydrolyzed too quickly in all tested conditions to be a practical germanium dioxide precursor. TPrOG was too viscous at room temperature to be considered practical. THOG was viscous at room temperature and so not easy to work with.

I have found that of the germanium alkoxides listed in Table I, the only one suitable for monolithic gel formation with TEOS is TPeOG. Having obtained germanium alkoxide, which showed promise of forming monolithic gel, more specific experiments were performed. Mixtures of TEOS and TPeOG were combined with other liquids listed above and permitted to gel. This procedure further defined the possible combinations. The more promising were TPeOG, TEOS, H$_2$O, ethanol, pentanol, and HCl. The latter was used as a catalyst; see "Glass Formation Through Hydrolysis of Si(OC$_2$H$_5$)$_4$ With NH$_4$OH and HCl Solution," M. Nogami and Y. Moriya, Journal Of Noncrystalline Solids, Vol. 37, pages 191-201 (1980). The following experiments were done to investigate this system. TEOS was mixed for several minutes with deionized water in molecular ratios, r, of 0.7, 1.33, and 2 moles of H$_2$O/mole of metal alkoxides. Then the hydrated TEOS mixture was combined with the predetermined amount of TPeOG and pentanol; and 0, 0.026, and 0.053 moles HCL per mole of alkoxides. The compositions formed are shown in Table II. The samples were put into 9 cm-diameter pyrex dishes and covered. Initial volumes were 50 cc. Duplicate samples of each mix were placed in a room temperature (23° C.) environment, and in an oven at 50° C. open to the atmosphere, and allowed to gel. All samples gelled within hours of final blending. Following gellation, the room temperature samples were placed in the oven with the others. The total time at 50° C. was 2 weeks. Subsequently, the materials were dried further at room temperature in a dry N$_2$ chamber. After a month, pieces of the samples were fired at 750° C., 900° C., and 1000° C. for 8 hours in an electric resistance muffle furnace open to the atmosphere. The furnace was heated at 20° C./hour. Following soak, they were cooled at the maximum furnace cooling rate.

In addition to the foregoing, the following comments are noted: it was found that TPeOG could be combined with the hydrolyzing liquid, including H$_2$O, up to r=4, before precipitate formation was evident. This combination of TEOS, TPeOG, and water is aided by cooling the liquids to be combined. The most promising OH donor we have found thus far is water. However, acetic acid and acetone are also possibilities, among others. The best way to combine the reactants was by first premixing the H$_2$O with Si(OC$_2$H$_5$)$_4$, forming a homogeneous solution either by addition of ethanol or heating to approximately 40° C.

TABLE II

| Sample | Reactant Content (Mole %) | | | | | | |
| | TPeOG | TEOS | H$_2$O | C$_2$H$_5$OH | C$_5$H$_{11}$OH | HCl | r |
| --- | --- | --- | --- | --- | --- | --- | --- |
| 111,211 | 7 | 17 | 17 | 32 | 27 | 0 | 0.7 |
| 112,212 | 7 | 17 | 17 | 32 | 27 | 0.5 | 0.7 |
| 113,213 | 7 | 17 | 17 | 32 | 27 | 1 | 0.7 |
| 121,221 | 6 | 12 | 25 | 33 | 23 | 0 | 1.3 |
| 122,222 | 6 | 12 | 25 | 33 | 23 | 0.5 | 1.3 |
| 123,223 | 6 | 12 | 25 | 33 | 23 | 1 | 1.3 |
| 131,231 | 6 | 10 | 30 | 32 | 21 | 0 | 2 |
| 132,232 | 6 | 10 | 30 | 32 | 21 | 0.5 | 2 |
| 133,233 | 6 | 10 | 30 | 32 | 21 | 1 | 2 |

EXAMPLE 1

In these initial experiments, a fixed combination of TEOS and TPeOG was mixed with three different water contents and those each with three different catalyst contents; see samples 111-233 in Table II. The average expected concentration of $GeO_2$ in the resulting glass from the samples ranges from about 30 to 36 mole percent.

After gellation at 23° C. or 50° C., the samples were examined to discern strength, transparency, color, number of breaks, homogeneity, Ge content, and bubble content; see Tables III and IV. In Tables III and IV, subjective evaluation of the factors shown were conducted, and a scale of 1 to 4 assigned: 1=worst, 4=best. On the basis of transparency, the r=2 samples which were initially held at room temperature could be eliminated. These were opaque white after drying. Additionally, several other samples from both gelling atmospheres which had the highest acid content were also opaque. In all cases, phase separation of the organometallics is the expected cause. The r=2 samples which were gelled at 50° C. had a white coating on their surfaces, indicating a segregation during gellation. The specimens which were held at room temperature for gellation showed the same problem for the slower gelling samples: those with none or the middle amount of catalyst and low water content. Therefore, regarding homogeneity, fast gellation can be considered an advantage if precipitation can be avoided. After further drying at 50° C., all the room temperature gelled samples which had not previously gone opaque white did so, with the exception of the sample containing the highest acid concentration at r=0.7. In addition to this sample, the r=0.7 and r=1.33 samples which were gelled at 50° C. remained transparent and homogeneous. These stayed this way through the further drying at room temperature.

The next important response is the size of the resultant dried pieces. All of the samples had broken in at least several pieces. Of the seven specimens which were transparent and homogeneous after gellation, the pieces averaged 1 $cm^2 \times 0.3$ cm thick. The largest piece was approximately 4 $cm^2 \times 0.3$ cm thick. This was the sample gelled at 50° C. for which r=1.33 and no HCl was added.

Pieces of all the samples, regardless of gelled condition, were fired to 750° C., 900° C., and 1000° C., all in air atmospheres according to heating schedules described above. In only one case, sample 112, did the condition of the initially unsatisfactory specimens improve with heat treatment. Specimen 113, which was gelled at room temperature to fairly good transparency and homogeneity, fired to a slight opalescence after 750° C. After 900° C., it was mostly opaque white, and after 1000° C. it began to foam. This is characteristic of samples having entrapped alkyl groups. After all firings, the samples which were gelled at 50° C. with r=0.7 cracked into very small fragments of clear glass.

TABLE III

4 = Best, 1 = Worst

| | GELLED 23° C. | | | | FIRED 900° C. | | | |
|---|---|---|---|---|---|---|---|---|
| Sample | Trans-parency | Homo-geneity | Light Scatter | Avg. Size ($cm^2$) | Trans-parency | Homo-geneity | Light Scatter | No. Of Breaks |
| 111 | 3 | 2 | 1 | 1 | 1 | 1 | — | 2 |
| 112 | 3 | 2 | 2 | 2 | 3 | 3 | 3 | 3 |
| 113 | 3 | 3 | 2 | 1 | 1 | 1 | — | 3 |
| 121 | 2 | 2 | — | 2 | 1 | — | — | 4 |
| 122 | 3 | 3 | 1 | 1.5 | 1 | 1 | — | 1 |
| 123 | 3 | 4 | 1 | 1 | 1 | 2 | — | 2 |
| 131 | 1 | — | — | 1 | 1 | — | — | 4 |
| 132 | 1 | — | — | 1 | 1 | — | — | 2 |
| 133 | 2 | 1 | — | 0.5 | 1 | 2 | — | 1 |

TABLE IV

4 = Best, 1 = Worst

| | GELLED 50° C. | | | | FIRED 900° C. | | | |
|---|---|---|---|---|---|---|---|---|
| Sample | Trans-parency | Homo-geneity | Light Scatter | Avg. Size ($cm^2$) | Trans-parency | Homo-geneity | Light Scatter | No. Of Breaks |
| 211 | 4 | 4 | 3 | 2 | 3 | 3 | 3 | 1 |
| 212 | 4 | 4 | 4 | 1 | 4 | 4 | 4 | 1 |
| 213 | 4 | 4 | 4 | 0.5 | 1 | — | — | 1 |
| 221 | 4 | 4 | 3 | 2 | 4 | 4 | 4 | 4 |
| 222 | 4 | 4 | 2 | 1 | 4 | 4 | 4 | 3 |
| 223 | 4 | 4 | 2 | 1 | 3 | 3 | 3 | 3 |
| 231 | 3 | 2 | 1 | 0.5 | 3 | 3 | 4 | 4 |
| 232 | 3 | 2 | 1 | 0.5 | 1 | 2 | 1 | 1 |
| 233 | 2 | 2 | 1 | 0.2 | 2 | 3 | 1 | 1 |

EXAMPLE 2

The 50° C. gelled samples having r=1.33 fired to clear glass at 750° C. exhibiting only a slight amount of scatter indicated by a blue hazy appearance. The samples exhibited the least scatter of any, with 221 and 222 being scatter-free after the 900° C. firing, even when illuminated with an He-Ne laser. There was evidence of foaming in these samples after the 1000° C. heat treatment. Slower heat treatments eliminate this. Additional breaks occurred in these samples during the firings. The specimens made with no or 0.026 molar acid catalyst broke in only one or two more places. The highest acid content specimen broke a bit more extensively during the higher temperature firings. The 50° C. gelled r=1.33 samples with low and medium catalyst content, 221 and 222, showed the best prospects for preparation of $GeO_2$—$SiO_2$ glasses. Samples of the above gels were analyzed by TGA at 5° C./min. from room temperature through 1000° C. prior to firing to discern the temperatures at which the OH and alkoxides were removed. The TGA curve for the best gel (sample 221) shows the following: a 7 percent weight loss occurs over the range of 50° C. to 150° C., and indicates primarily the loss of adsorbed $H_2O$; the curve is relatively flat from 150° C. to 350° C.; and shows a 5 percent weight loss over the range of 350° C. to 500° C., indicating the loss of absorbed $H_2O$ and residual organic material; above 500° C., a 1 weight percent loss of organic material.

The refractive index at 0.5893 microns is 1.4920, indicating that the samples have a lower germania content than anticipated. The refractive index, thermal expansion coefficient ($4 \times 10^{-6}$), and glass transition temperature (695° C.) suggest a composition containing 28 mole percent $GeO_2$. This lower than expected amount of $GeO_2$ incorporation in the final glass is believed due to alcohol impurities in the starting TPeOG.

It has been shown that for other monolithic gel-forming systems, the microstructure of the gel is dependent on the initial water content of the solution. The preparation of glasses through the monolithic route with low water content, such as reported here, generally leads to extensive polymerization. If the water content is significantly in excess of that required for complete hydrolysis, then the resultant gel is formed of colloidal particles. With this type of gel, the objective water content should exceed 10 moles/mole for good monolithic gel formation. The advantage of the higher water content is fabrication of larger pieces of monolithic gel, but firing temperatures several hundred degrees higher are generally required; see Nogami (above). Such high water silica gels were recently formed, dried, fired, and drawn into low loss fiber; see "New Optical Fibre Fabrication Method," K. Susa et al, *Electronics Letters*, Vol. 18, pages 499–500 (1982).

The TEOS-TPeOG monolithic gel system discussed here is apparently limited to an amount of water only sufficient for complete hydrolysis if homogeneity of the initial solution is to be maintained. The extensive polymerization with numerous partially hydrolized metal ions is a favorable reaction when the system contains organometallics with such different hydrolysis rates. Partial prereaction of $H_2O$ with the slower reacting compound, TEOS, as was done in these experiments, favors homogeneous solutions and resultant gels. The extensive polymerization and partial crosslinking seem to promote low temperature densification, generally in the region of $T_g$ (glass transition temperature). However, if hydrolysis is incomplete, alkyl groups can become entrapped in the small pore structure of the glass. This can cause bubbling in the glass at temperatures above $T_s$ (glass softening temperature). The solution is very slow heat treatment and temperature soaks at the critical temperatures observed in TGA. For these experiments, heat treatment at 20° C./hr. seemed to be sufficient to avoid the high-temperature bubbling.

The best results in the above experiments were obtained with samples 221, 222, and 223, containing 1.33 moles of water per mole of alkoxide which was gelled rapidly at 50° C., left a month to dry at room temperature in a dry box, and then fired at a rate of 20° C./hour to 900° C. and held for 1 hour. A wide range of compositions have been fabricated with good properties using similar fabrication methods. With modifications to the above preparation procedures, glasses covering the complete $GeO_2$—$SiO_2$ binary can be made.

When making optical devices, the present technique is typically used to form a relatively thin glass coating on a substrate or a small piece of bulk glass. Subsequent operations, including etching, diffusion, or implantation of various dopants, can be performed. When making an optical fiber, a series of cylinders of differing diameters can be made by the present technique. The cylinder walls can be made relatively thin, typically on the order of a millimeter, to minimize problems of cracking when drying the gel. The smaller cylinders can be inserted into the larger ones to form a preform from which an optical fiber is drawn. The preform can be collapsed to eliminate the center hole prior to drawing the fiber, according to techniques known in the optical fiber art. Other geometries and operations can be used to make optical fibers and devices using glass made according to the present invention.

When still lower optical loss is desired, additional removal of water (OH) from the glass can be accomplished. For example, drying in chlorine at an elevated temperature will remove additional water. Other dopants, for example, phosphorus, boron, fluorine, etc., can be included in glass made by the inventive technique. These can further modify the refractive index, or melting point, or thermal coefficient of expansion, or other properties according to considerations known in the art.

What is claimed is:

1. A method of making an article comprising a germanium-containing silicate glass characterized by steps comprising forming a gel substantially comprising hydrolyzed tetra pentyloxygermane and a hydrolyzed silicon alkoxide, and substantially drying said gel.

2. The method of claim 1 wherein said silicon alkoxide is tetraethylorthosilicate.

3. The method of claim 1 wherein said gel is formed with less than 4 moles of $H_2O$ per mole of metal alkoxides.

4. The method of claim 1 wherein said article is an optical component.

* * * * *